(12) United States Patent
Scheyvaerts et al.

(10) Patent No.: US 11,242,281 B2
(45) Date of Patent: Feb. 8, 2022

(54) GLASS SUBSTRATE FOR CHEMICAL STRENGTHENING AND METHOD FOR CHEMICALLY STRENGTHENING WITH CONTROLLED CURVATURE

(71) Applicant: AGC GLASS EUROPE, Louvain-la-Neuve (BE)

(72) Inventors: Florence Scheyvaerts, Brussels (BE); Laurent Dusoulier, Aubel (BE); Jean-Michel Depauw, Brussels (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 892 days.

(21) Appl. No.: 15/741,795

(22) PCT Filed: Jul. 8, 2016

(86) PCT No.: PCT/EP2016/066298
§ 371 (c)(1),
(2) Date: Jan. 4, 2018

(87) PCT Pub. No.: WO2017/009235
PCT Pub. Date: Jan. 19, 2017

(65) Prior Publication Data
US 2018/0194678 A1    Jul. 12, 2018

(30) Foreign Application Priority Data
Jul. 16, 2015  (EP) .................................... 15177057

(51) Int. Cl.
*B32B 17/06* (2006.01)
*C03C 21/00* (2006.01)
*C03C 17/245* (2006.01)

(52) U.S. Cl.
CPC .......... *C03C 21/002* (2013.01); *C03C 17/245* (2013.01); *C03C 2217/21* (2013.01); *C03C 2217/216* (2013.01); *C03C 2217/217* (2013.01); *C03C 2217/228* (2013.01); *C03C 2218/156* (2013.01); *C03C 2218/328* (2013.01); *C03C 2218/33* (2013.01); *C03C 2218/34* (2013.01); *C03C 2218/355* (2013.01); *C03C 2218/36* (2013.01); *C03C 2218/365* (2013.01)

(58) Field of Classification Search
CPC ..................... C03C 17/245; C03C 2217/216
See application file for complete search history.

(56) References Cited

U.S. PATENT DOCUMENTS

| 2011/0293928 A1 | 12/2011 | Chu et al. |
| 2013/0017380 A1 | 1/2013 | Murata et al. |
| 2014/0127474 A1 | 5/2014 | Chu et al. |
| 2014/0170380 A1 | 6/2014 | Murata et al. |
| 2014/0305165 A1 | 10/2014 | Okahata et al. |
| 2015/0329418 A1 | 11/2015 | Murata et al. |

FOREIGN PATENT DOCUMENTS

| DE | 10 2007 009 785 A1 | 8/2008 | |
| JP | 2015-13774 A | 1/2015 | |
| WO | WO-2013099620 A1 * | 7/2013 | ............. C03C 3/087 |
| WO | 2014/156577 A1 | 10/2014 | |

OTHER PUBLICATIONS

International Search Report and Written Opinion dated Sep. 22, 2016 in PCT/EP2016/066298 filed Jul. 8, 2016.
Extended European Search Report dated Jan. 8, 2016 in European Application 15177057.5 filed Jul. 16, 2015.

* cited by examiner

*Primary Examiner* — Zachary M Davis
(74) *Attorney, Agent, or Firm* — Oblon, McClelland, Maier & Neustadt, L.L.P.

(57) ABSTRACT

The invention relates to a glass substrate for chemical strengthening where a surface is coated by magnetron sputtering with a temporary thin film that reduces the extent of ion exchange upon chemical strengthening and where the temporary thin film can be removed after the chemical strengthening by treatment with an etchant solution. Other embodiments relate to a method for making a chemically strengthened glass substrate with controlled curvature comprising: providing a substrate with opposed surfaces that are durable to a given etchant solution, forming a temporary thin film upon at least part of a surface of the glass substrate, chemically strengthening the glass substrate bearing the temporary thin film, and removing the temporary thin film after said chemical strengthening with said etchant solution. The thickness of the temporary thin film is chosen such that a controlled curvature is obtained upon chemical strengthening.

19 Claims, No Drawings

GLASS SUBSTRATE FOR CHEMICAL STRENGTHENING AND METHOD FOR CHEMICALLY STRENGTHENING WITH CONTROLLED CURVATURE

The present invention relates to a glass substrate for chemical strengthening, to a method for reducing warpage of a glass substrate caused by a chemical strengthening process, and a method for producing a chemically strengthened glass substrate.

For many years glass has been the material of choice for building and vehicle windows and also for display covers. Glass offers high chemical and mechanical strength and high transparency. Glass is also compatible with any kind of display technology such as LCD, plasma display, OLED as well as with a large range of touch-screen interface technologies. Glass covers are for example used on television screens, smartphones, mobile phones, tablet computers, electronic books, watches, and computer displays. The more recent trend in display technology goes towards both thinner, lighter and larger devices. A similar trend towards larger and lighter windows is also seen in the transportation industry (i.e. automotive, aeronautical). Therefore it has become necessary to manufacture thinner glass covers that still offer desirable optical properties as well as the necessary mechanical and chemical resistance.

One well known technology for strengthening glass is chemical strengthening. In chemical strengthening, an alkali-containing glass is immersed in an heated bath containing a molten alkali salt such as for example $KNO_3$ at temperatures well below the glass annealing point. An ion exchange between the host alkali ions of the glass and invading alkali ions from the molten salt occurs. If the invading ions are larger in size than the host ions, then the resultant packing of the invading ions in a near-rigid atomic network of glass leads to the development of a stress profile comprising high surface compression and some balancing interior tensile stress depending on the amount of ions exchanged, the depth of ion exchange and glass sheet thickness. Compared to other glass strengthening processes, chemical strengthening has the advantage that it introduces higher surface compression without optical distortion and it can be applied to thin glass sheets, even below 1 mm thickness.

Depending on the process parameters of the chemical strengthening process and on the glass substrate, different extents of ion exchange are obtained. The extent of ion exchange, that is the amount of ions exchanged and the depth of the ion exchange layer in the glass substrate, results in stress profiles having a compressive surface stress (CS) between 300 and 1300 MPa with a depth of the compressive layer (DOL) ranging from a few microns to several hundred microns. The overall level of strengthening is determined by the stress profile across the thickness of the glass substrate. In order to obtain high fracture strength a stress profile with high DOL values and high CS values is necessary. Depending on the intended use of the display device, the chemically strengthened display cover glass is typically required to have a compressive surface stress (CS) higher than 600 MPa with a depth of the compressive layer (DOL) higher than 12 µm.

Many different kinds of glass types can be used in chemical strengthening, they usually contain an alkali ion, called host ion, having a relatively small ion radius, such as a lithium or sodium ion, that can be exchanged with another ion, called invading ion, having a relatively larger ion radius such as a potassium, rubidium or cesium ion. The glass substrates are typically used as glass sheets of varying sizes having two opposing major surfaces.

Some glass substrates have opposed surfaces with different ion exchange properties, one high ion exchange surface and one low ion exchange surface. On the high ion exchange surface the extent of ion exchange, extent of ion exchange, that is the amount of ions exchanged and/or the depth of the ion exchange layer, is higher than on the opposed low ion exchange surface. With such substrates it has been observed that when the amount of ions exchanged and/or the depth of ion exchange is different on the two sides of a glass sheet, CS and DOL are different on the two sides and the resulting stress profile across the thickness of the glass sheet is asymmetric. When the stress profile is asymmetric and the CS and DOL of both sides do not outbalance each other this can then cause the normally flat glass substrate to curve or to warp. Indeed in some cases the stress profile across the thickness of a glass sheet is asymmetric but balanced so that no warp occurs. Particularly when glass substrates are thin, for example less than 1.6 mm thick and when high strengthening levels are required, such as for display covers for example, the level of warpage can become very high. Some of the reasons for this differing ion exchange behavior have been identified. In some cases the amount of the host ion sodium close to the surface may be lower on one side of a glass sheet due to a dealkalization step applied during its production. Another reason may be the presence of tin in the surface layer of one side of the glass sheet due to the float process used for the production of the glass, where the bottom side of the glass comes into contact with a bath of molten tin and the top side does not. The ion exchange on the bottom side of the glass is then slower than on the top side.

One way of avoiding the warpage of the chemically strengthened glass is to limit the level of strengthening. However the glass may not reach the mechanical resistance required for its intended use.

Another way of avoiding warpage is to polish, etch or grind one glass surface or both glass surfaces before the chemical strengthening, thereby removing the surface layer that provokes the differences in the ion exchange properties. This process is however both time consuming and complicated especially for large, thin glass substrates.

Patent application US2014/0305165 describes a method for reducing the warpage caused by chemical strengthening that relies on forming a chemical vapor deposited film containing a specific amount of H atoms on the high ion exchange surface which is for example the top side of a glass formed by a float process. The adjustment of H atom content in the film controls the diffusion rate of ions through the film and thus the stress profile obtained through chemical strengthening. Such adjustments of H atom content are necessary not only because the ion exchange properties of the surface layers of glass are different for different glass types, but also because fluctuations occur during production of a single glass type and of course because chemical strengthening process conditions may change. However adjusting the amount of H atoms in a chemical vapor deposited film is far from easy. On one hand the deposition involves complicated physical and chemical reactions that are difficult to predict, on the other hand verifying the amount of H atoms in this film cannot be done easily during the film deposition process itself. Furthermore the film remains permanently on the substrate and will have an impact on its optical properties, its surface properties such as roughness for example and has to be taken into account for all subsequent processes.

Terminologies

Compressive surface stress (CS): the stress that results from extrusion effect on a glass network by glass surface after ion exchange in the glass, as measured by commercially available surface stress meter FSM from Orihara Industrial Co. Ltd., based on the optical principle.

Depth of ion exchanged layer (DOL): the thickness of the glass surface layer where ion exchange occurs and compressive stress is produced. DOL can be measured by commercially available surface stress meter FSM from Orihara Industrial Co. Ltd. based on the optical principle.

Central tensile stress (CT): the tensile stress that is generated in the interlayer of glass and counteracts the compressive stress that is generated between the upper and lower surfaces of the glass after ion exchange. The CT can be calculated from the measured CS and DOL values.

Warpage: the warpage of a glass sheet is the deviation from flatness of a curved glass sheet. The level of warpage may be evaluated by measuring the curvature. The warpage direction may be concave or convex relative to a chosen side of the substrate.

Aim

An aim of the present invention is to provide a glass substrate for chemical strengthening bearing on at least part of a surface an easily removable temporary thin film that modifies the extent of ion exchange upon chemical strengthening of the coated surface.

In particular, an aim of the present invention is to provide a glass substrate having a low ion exchange surface and a high ion exchange surface and an easily removable temporary thin film on the high ion exchange surface that can be chemically strengthened with a low level of warpage or even remaining substantially flat.

Another aim of the present invention is to provide a process for obtaining a curved chemically strengthened glass substrate with controlled curvature and preferably bearing no coating.

In particular, an aim of the present invention is to provide a process for chemically strengthening a glass substrate having opposed surfaces with differing ion exchange properties so as to obtain a chemically strengthened glass substrate with low level of warpage and preferably bearing no coating.

Another aim of the present invention is to provide a glass substrate having different ion exchange properties on its two faces, that is chemically strengthened, has low warpage or is even substantially flat and bears no coating.

DESCRIPTION OF THE INVENTION

The present invention concerns a glass substrate for chemical strengthening having first and second opposed surfaces that are durable to a given etchant solution in their uncoated state where at least a part of the substrate is coated on the first surface with a first temporary thin film that reduces the extent of ion exchange upon chemical strengthening, where the first temporary thin film can be removed after the chemical strengthening by treatment with said etchant solution, and where the thickness of the first temporary thin film is chosen such that a first controlled curvature is obtained upon chemical strengthening in the part of the substrate coated by the first temporary thin film on the first surface.

The inventors have surprisingly found that the extent of ion exchange at a glass substrate's surface can be reduced with a temporary thin film that can be removed by etching without attacking the uncoated glass surfaces. Thereby they were able to modify and control the extent of ion exchange of a glass surface so as to control the level and direction of curvature obtained upon chemically strengthening the glass substrate. The inventors also found that the temporary thin film could be removed after the chemical strengthening by etching for example with a given etchant solution thus restoring the surface to a pristine, coating-free state. The substrate's surfaces in their uncoated state are durable to said etchant solution, that is they are not etched or attacked by it within the time necessary to remove the temporary thin film. The etchant solution may be an aqueous solution of an acid or of a base, for example vinegar. Pristine, uncoated chemically strengthened glass substrates having almost a controlled curvature could be obtained by increasing the difference in ion exchange properties of a glass substrate's opposed surfaces.

For a given substrate, a given temporary thin film composition and given chemical strengthening conditions, the inventors found that the curvature upon chemical strengthening depended essentially on the thin film's thickness. Thus they were able to obtain a controlled curvature by choosing the thickness of the temporary thin film.

In a particular embodiment of this invention, a glass substrate for chemical strengthening is provided where additionally to the first temporary thin film at least part of the substrate is coated on the first surface with a second temporary thin film that reduces the extent of ion exchange upon chemical strengthening and that is different from the first temporary thin film, where the second temporary thin film can be removed after the chemical strengthening by treatment with said etchant solution, and where the thickness of the second temporary thin film is chosen such that a second controlled curvature is obtained upon chemical strengthening in the part of the substrate coated by the second temporary thin film on the first surface.

The inventors found that when different temporary thin films were present on at least parts of a substrate surface, different controlled curvatures could be obtained on the different coated parts of the substrate. The first and second temporary thin films may differ by their thickness and/or by their composition.

In another particular embodiment of this invention, a glass substrate for chemical strengthening is provided where, additionally to the first or to the first and second temporary thin film, at least part of the substrate surface is coated on the second surface with a third temporary thin film that reduces the extent of ion exchange upon chemical strengthening, where the third temporary thin film can be removed after the chemical strengthening by treatment with said etchant solution, and where the thickness of the third temporary thin film is chosen such that a third controlled curvature is obtained upon chemical strengthening in the part of the substrate coated by the third temporary thin film on the second surface.

The inventors found that when different temporary thin films were present on at least parts of both opposed substrate surfaces, more diverse and different controlled curvatures could be obtained on the different coated parts of the substrate. The third temporary thin film may differ from the first and/or second temporary thin film by its thickness and/or by its composition or not.

In one particularly preferred embodiment of the present invention, a glass substrate for chemical strengthening is provided, having first and second opposed surfaces that are durable to a given etchant solution in their uncoated state, where the first and second opposed surfaces have differing ion exchange properties in their uncoated state before chemical strengthening, the first being a high ion exchange surface and the second being a low ion exchange surface, where at least a part of the substrate is coated on the first surface with a first temporary thin film that reduces the extent of ion exchange upon chemical strengthening, where the first temporary thin film can be removed after the chemical strengthening by treatment with said etchant solution, and where the thickness of the first temporary thin film is chosen such that a first controlled curvature comprised between −0.04*1/m and 0.04*1/m is obtained upon chemical strengthening in the coated part of the substrate. Preferably the substrate is coated on essentially the entirety of the first surface and a controlled curvature comprised between −0.04*1/m and 0.04*1/m is obtained on the entire substrate upon chemical strengthening. Preferably the substrate is essentially completely coated on the first surface and a controlled curvature comprised between −0.01*1/m and 0.01*1/m is obtained on the entire substrate upon chemical strengthening.

The inventors found that glass substrates with opposed surfaces having differing ion exchange properties in their uncoated state could be chemically strengthened with low curvature, even with essentially no curvature when a temporary thin film that reduces the extent of ion exchange upon chemical strengthening was present on the high ion exchange surface. They found that when the temporary thin film had a certain chosen thickness, the ion exchange properties of the high exchange surface could be adapted to the ion exchange properties of the opposed low ion exchange surface. The chosen thickness depends on the temporary thin film composition, the chemical strengthening conditions and the substrate glass.

The present invention also concerns a method for chemically strengthening a glass substrate comprising the following operations:
  a) providing a substrate having first and second opposed surfaces that are durable to a given etchant solution,
  b) coating on at least part of the substrate on the first surface a first temporary thin film that reduces the extent of ion exchange upon chemical strengthening,
  c) chemically strengthening the coated glass substrate,
  d) removing the temporary thin film after said chemical strengthening with said etchant solution.

In a particular embodiment of the present invention, the method comprises before operation c) an additional operation of coating on at least part of the substrate on the first surface a second temporary thin film that reduces the extent of ion exchange upon chemical strengthening and/or an additional operation of coating on at least part of the substrate on the second surface a third temporary thin film that reduces the extent of ion exchange upon chemical strengthening.

In a particularly preferred embodiment of the present invention, the invention provides a method for chemically strengthening a glass substrate comprising the following operations:
  a) providing a substrate having first and second opposed surfaces that are durable to a given etchant solution, the first and second opposed surfaces having differing ion exchange properties in their uncoated state, the first being a high ion exchange surface and the second being a low ion exchange surface,
  b) coating on at least part of the substrate on the first surface a first temporary thin film that reduces the extent of ion exchange upon chemical strengthening, having a thickness such that a first controlled curvature comprised between −0.04*1/m and 0.04*1/m is obtained upon chemical strengthening,
  c) chemically strengthening the coated glass substrate,
  d) removing the temporary thin film after said chemical strengthening with said etchant solution.

The present invention also concerns a chemically strengthened glass substrate having first and second opposed surfaces with differing ion exchange properties, that is substantially flat and that bears no coating. Preferably the chemically strengthened glass substrate has on both opposed surfaces CS values of at least 400 MPa and DOL values of at least 6 µm. CS values are preferably comprised between 400 MPa and 1200 MPa, DOL values are preferably comprised between 6 µm and 40 µm. Preferably the chemically strengthened glass substrate has a thickness comprised between 0.1 mm and 3 mm. When the glass substrate is soda lime glass the two opposed surfaces' CS values are preferably at least 400 MPa at DOL values of at least 8 µm. When the glass substrates are alumino-silicate glass substrates the CS values are preferably at least 650 MPa and the DOL values at least 16 µm.

Glass substrates suitable for use in connection with the present invention include in particular flat, sheet-like glass substrates, having two major opposed surfaces and having a composition capable of being strengthened by chemical strengthening. The glass substrates suitable for us in connection with the present invention may have differing ion exchange properties on their first and second opposed surfaces or not.

Specific examples thereof include soda-lime silicate glass, alumino-silicate glass, borate glass, lithium alumine silicate glass, borosilicate glass, and alkali-free glass, and transparent glass plates formed of various other kinds of glass. Soda-lime glass and alumino-silicate glass is particularly often used.

Among them, glass containing alkali metal ions or alkali earth metal ions, that have smaller ion radius, is preferred, and glass containing Na ions is more preferred. A glass substrate containing $Na^+$ ions is capable of being subjected to ion exchange with alkali metal ions having ion radius larger than $Na^+$, for example $K^+$ ions. The $Na^+$ ions can thus be effectively replaced to thereby strengthen the glass, even when the glass substrate has a temporary thin film formed on a surface thereof.

The composition of the glass substrate for chemical strengthening according to the present invention is not particularly limited, other than by the fact that it should permit ion exchange. For example, the following glass compositions may be used.

The composition of a glass substrate of the invention is not particularly limited and may belong to soda-lime-silicate glass, boro-silicate glass or alumino-silicate glass, or to a still different type of glass insofar as it contains alkali. In particular it may formed into sheet glass by the float method.

Preferably, the composition of the glass substrate of the invention is boron- and lithium-free. This means that the elements boron and lithium are not intentionally added in the glass batch/raw materials and that, if present, their content in the composition of the glass sheet reaches only level of an impurity unavoidably included in the production.

In an embodiment, the composition of the glass substrate comprises the following in weight percentage, expressed with respect to the total weight of glass:

| | |
|---|---|
| SiO2 | 55-78% |
| Al2O3 | 0-18% |
| B2O3 | 0-18% |
| Na2O | >0-20% |
| CaO | 0-15% |
| MgO | 0-10% |
| K2O | 0-10% |
| BaO | 0-5% |

Advantageously, notably for low production costs reasons, the composition of the glass substrate is a soda-lime-silicate glass. According to this embodiment, the composition of the glass substrate comprises the following in weight percentage, expressed with respect to the total weight of glass:

| | |
|---|---|
| SiO2 | 60-78% |
| Al2O3 | 0-8% |
| B2O3 | 0-4% |
| CaO | 0-15% |
| MgO | 0-10% |
| Na2O | 5-20% |
| K2O | 0-10% |
| BaO | 0-5%. |

Preferably, the composition of the glass substrate comprises the following in weight percentage, expressed with respect to the total weight of glass:

| | |
|---|---|
| SiO2 | 60-78% |
| Al2O3 | 0-6% |
| B2O3 | 0-1% |
| CaO | 5-15% |
| MgO | 0-8% |
| Na2O | 10-20% |
| K2O | 0-5% |
| BaO | 0-1%. |

Glass substrates suitable for the use in the present invention must be durable to a given etchant solution to be used for removing the temporary thin film. That is the glass substrates are not attacked in a significant degree by the etchant solution under the conditions used for removing the temporary thin films. The glass compositions above are generally resistant to weak acids and bases under common conditions for removing temporary thin films as described below.

The thickness of the glass substrates suitable for use in connection with the present invention is not particularly limited. Generally, the thickness of the glass substrate is preferably 3 mm or less for performing an effective chemical strengthening process which will be described later. The issue of warpage upon chemical strengthening is important for glass substrates having a thickness comprised between 0.1 mm and 3 mm, particularly having a thickness comprised between 0.1 mm and 1.6 mm, and most important for glass substrates having a thickness comprised between 0.1 mm and 0.7 mm. The issue of warpage upon chemical strengthening becomes also more important when the glass substrates have a low thickness, comprised between 0.1 mm and 1.6 mm, and a high required strengthening level. For soda-lime compositions, the issue of warpage is important for compressive surface stress levels of at least 400 MPa and depth of compressive layer larger than 6 µm, particularly larger than 8 µm. For alumino-silicate compositions, the issue of warpage is particularly important for compressive surface stress levels of at least 650 MPa and depth of compressive layer larger than 15 µm.

One method to assert that the glass substrate has differing ion exchange properties on its opposing surfaces comprises the following steps: chemically toughen the glass substrate and measure the warpage or determine CS and DOL or analyze and compare the penetration profiles of the invading ion on each surface.

Preferably the chemical strengthening is performed in a bath of molten salt, preferably comprising $KNO_3$ at a temperature between 400 and 500° C. for a duration of 20 minutes to 24 hours. CS and DOL can then be determined by the methods described above. The penetration profile of the invading ion in each glass surface can be determined by known Secondary Ion Mass spectroscopy (SIMS) or, preferably, by known X-ray Photoelectron Spectroscopy (XPS) methods. The amounts of invading ion, such as $K^+$ for example, can be compared using X-ray fluorescence measurements on the chemically strengthened substrates.

In order to quantify the warpage of a substrate, a 4×4 $cm^2$ sample is measured with a DEKTAK 6M Stylus Profiler. The stylus successively plots the linear profile along two orthogonal 3 mm long lines at the sample's center. For each orthogonal line three measurements are made and the curvature is calculated from the average of the six measurements using a parabolic fit and known calculus methods. By convention, when the warpage direction is concave the curvature is given a positive sign, when the warpage direction is convex the curvature is given a negative sign. By convention float glass substrates are measured with the tin side facing the profiler's stylus and as the curvature is the reciprocal of a radius, the unit is 1/m. A glass substrate is considered as having low warpage or low curvature when the curvature is comprised between −0.04*1/m and 0.04*1/m or the curvature radius is not less than 25 m at the center of the substrate. A glass substrate is considered as substantially flat or as having substantially no curvature when the absolute value of the curvature is not greater than 0.01*1/m or the curvature radius is not less than 100 m. A glass substrate is considered as having significant warpage or significant curvature when the absolute value of the curvature is higher than 0.04*1/m.

The temporary thin film of the present invention may comprise a thin film of any suitable material having the desired characteristics, that is they influence the ion exchange properties of a coated glass surface and are removable by an etching method that does not affect the glass substrate. Many different materials are known as barriers to alkali metal migration, for example $TiO_2$, $ZrO_2$, $SnO_2$, $Al_2O_3$. Particularly efficient alkali metal barriers are $SiO_2$, $Si_3N_4$, Zinc-tin oxide. Different methods exist for etching these materials, that are difficult and/or expensive to implement and often involve toxic and/or dangerous chemicals. These materials are therefore not preferred as temporary thin films.

Preferably the temporary thin film comprises a thin film of a material having the desired characteristics, that is it influences the ion exchange properties of a coated glass surface and is removable by an etchant solution to which the uncoated glass substrate is durable. Wet-etching with such an etchant solution is generally preferred since it offers a rapid, low-cost process. In relation to a chemical strengthening process the wet etching operation may be combined with the washing operation that is commonly performed after chemical strengthening of glass. For example the temporary thin film may be formed of a material that is removed by an etchant solution containing a base or an acid, preferably the etchant solution is an aqueous solution. The acid may be an inorganic acid such as for example HCl or $HNO_3$. The base may be an inorganic base such as NaOH or KOH. In a preferred embodiment of the present invention the acid is a weak acid, most preferably a weak organic acid such as acetic acid or citric acid that is more environmentally friendly and non-toxic. When the acid is a liquid under standard conditions of pressure and temperature, it may also be used in pure form. For instance acetic acid may be used as etchant solution in its undiluted form, also called glacial acetic acid or diluted by water, for instance diluted with water so as to contain between 3% and 9% by volume of acetic acid, such as in vinegar for instance. While the acidity of the acid etchant solution may vary, it's pH value is most commonly comprised between 2 and 4. In an alternative embodiment of the present invention, the temporary thin film comprises a material that is removed by an etchant solution containing a weak base such as ammonia. While the pH of the basic etchant solution may vary, its pH value is most commonly comprised between 8 and 10. The etching is typically performed at temperatures close to room temperature or slightly above room temperature, for example at a temperature comprised between 20° C. and 50° C. The duration of the etching depends on the etchant used, the temperature of the etching solution, the temporary thin film and its thickness.

The temporary thin film is preferably formed of a material that is completely removed by a chosen etchant solution. It is advantageous to form the temporary thin film of a material than can be deposited in the necessary thickness, using common deposition techniques such as chemical vapor deposition, plasma enhanced chemical vapor deposition or, preferably, magnetron sputtering, on common industrial coating lines within economically reasonable cycle times.

The temporary thin film is advantageously formed of a material which has sufficient mechanical and chemical durability to withstand the normal processing conditions of glass in transport, handling and storage. Preferably the temporary thin film of the present invention comprises an oxide of one or more metals chosen among zinc, bismuth, cadmium, iron or nickel. The metal oxides of this group have sufficient mechanical and chemical durability to withstand the normal processing conditions of glass. The oxides of this group also can be removed by an etchant solution containing a base or an acid. They are also able to influence the ion exchange behavior of the glass surface on which they are deposited.

Most preferably the temporary thin film of the present invention comprises zinc oxide. Zinc oxide is particularly well suited for use as a temporary thin film in the present invention because it is able to influencing the ion exchange behavior of a glass surface. Zinc oxide can be efficiently deposited over a wide range of thicknesses using known deposition techniques. The inventors found that the variation of the thickness of a zinc oxide temporary thin film allows the progressive modification of the ion exchange properties of a glass over a wide range. Zinc oxide has the particular advantage over other thin films that block ion exchange in very efficient manner. Indeed the inventors found that when the temporary thin film comprises zinc oxide, the curvature upon chemical strengthening can be fine-tuned using a large thin film thickness range. Thin films that block the ion exchange in a more efficient manner, cannot be used to fine-tune the curvature upon chemical strengthening because small changes in film thickness lead to large changes in the extent of ion exchange. The inventors also found that after chemical strengthening the zinc oxide temporary thin films are readily removed by etchant solutions such as weakly acidic solutions such as acetic acid based etchant solutions, for example vinegar, to which almost all glass substrates suitable for chemical strengthening are durable. Zinc oxide may be deposited in fully oxidized form or as a suboxide. In a particular embodiment of the present invention the temporary thin film essentially consists of zinc oxide.

In another embodiment of the present invention other metal oxides are present in the temporary thin film together with zinc oxide. Zinc oxide may for example be doped with metals such as aluminum, boron, gallium, indium or tin. In these cases the metal to zinc atomic ratio is not greater than 0.1, preferably not greater than 0.05 in order to guarantee easy removal by a weak acid.

In an embodiment of the invention the zinc oxide based film is deposited by chemical vapor deposition using an organometallic zinc precursor at a glass temperature between 200° C. and 700° C. In another embodiment of the present invention the zinc oxide based film is deposited by plasma enhanced chemical vapor deposition at a glass temperature below 300° C.

In a preferred embodiment of the invention the temporary thin film comprises a film of sputtered material. Sputtered thin films can be deposited with a large degree of compositional and thickness uniformity on a wide range of substrate compositions and thicknesses. Temporary thin films of the present invention are substantially non-porous and well adhering and hence provide sufficient mechanical and chemical durability to withstand the normal processing conditions of glass. Sputtered metal oxide temporary thin films of the present invention are preferably deposited by magnetron enhanced sputtering processes. The metal oxides can be deposited by sputtering from a target formed of the metal of the desired metal oxide in an oxidizing atmosphere. The sputtering atmosphere may consist of pure oxygen or a mixture of oxygen and an inert gas such as argon. Preferably the sputtering atmosphere comprises oxygen an up to about 40% of argon. Alternatively the metal oxides can be deposited by sputtering a target formed of the metal oxide itself in a non-reactive atmosphere, such as argon. In this case the metal oxide target commonly comprises a dopant such as Al, Ga, In, or Sn in order to increase the electrical conductivity of the target. With any of these sputtering processes the metal oxide films are essentially free of hydrogen that might influence their effect on the ion exchange properties of a glass surface. As will be appreciated by those skilled in the art, various deposition parameters can be adapted to control the deposition rate and quality of the film, such as the power applied to the sputtering target and the partial pressures of the gases making up the sputtering atmosphere.

Sputtering processes are particularly useful for depositing the temporary thin film only on selected areas for example by using masks during deposition. They can also be adapted for depositing on both sides of the substrate, simultaneously or sequentially.

Temporary thin films suitable in connection with the present invention preferably have a thickness comprised between 1 and 200 nm. Thickness adjustments because of different glass types with different ion exchange properties, and/or because of fluctuations during production of a certain glass type and/or because of different chemical strengthening process conditions, and because of different warpage or curvature requirements are easily made and easily monitored during the coating process using common thickness monitoring techniques.

The temporary thin film of the present invention is formed at least over part of a surface of the glass substrate. It may also be deposited with at least two different thicknesses over more than one part of a glass substrate. The inventors have found that this leads to areas having different curvatures on different parts of the glass substrate. It may also be deposited over at least a part of both substrate surfaces. Thereby different levels and directions of curvature can be obtained upon chemical strengthening. In a particular embodiment of the present invention the temporary thin film is deposited over essentially the entirety of one substrate surface. Thereby a uniform curvature is obtained over the whole substrate.

Temporary thin film thicknesses in the range between 20 and 60 nm are preferred for reducing warpage upon chemically strengthening glass, in particular of 0.5 mm to 0.7 mm thickness, as they manage to compensate for the range of differences of ion exchange properties generally observed on opposed surfaces of float glass substrates. Thus substrates having substantially no curvature after chemical strengthening can be obtained. These temporary thin films are thick enough to have an effect on the warpage upon chemical strengthening of the substrate. Thicknesses in this range are also preferred as they allow fast etching after the chemical strengthening step with the desired etchant solution.

Depending of the thickness of the temporary thin film, the glass thickness, and the chemical strengthening conditions, significant curvatures of at least 1*1/m, at least 5*1/m, and even at least 10*1/m can be obtained.

Chemical strengthening processes suitable for the present invention preferably comprises the so-called low temperature type ion exchange using an external source of invading alkali ion relatively large in ion radius compared to the host ion radius. In the ion exchange process the external source of invading alkali ions may be used as a molten salt bath, as sprayed-on salt mixture, as a paste or as a vapor. Examples of the molten salts for performing the ion exchange process include potassium nitrate, and alkali sulfates and alkali chlorides, for example, such as sodium sulfate, potassium sulfate, sodium chloride and potassium chloride. These molten salts may be used either alone or in combination.

The chemical strengthening process may be performed, for example by immersing the glass substrate in bath of molten potassium nitrate at a temperature between 400 and 500° C. for 5 minutes to 24 hours. As will be appreciated by those skilled in the art, various process parameters of the ion exchange can be selected by taking into consideration the composition and thickness of the glass, the molten salt used, and the stress profile required for the final use of the chemically strengthened glass.

In another preferred embodiment of the present invention the chemical strengthening is performed by immersing the glass substrate in bath of molten potassium nitrate at a temperature between 400 and 500° C. for 24 hours to 48 hours. It was found that these conditions were particularly efficient for obtaining significant curvature levels without breakage of the glass substrates.

Examples of final uses of chemically strengthened glass substrates of the present invention include cover glass of display devices such as digital cameras, cell phones, smartphones, touch pads, PDAs and touch panels, and any display cover.

Examples

Comparison examples C1 to C4 are 4*4 cm² soda lime float glass samples of 0.55 or 0.7 mm thickness that were not coated with a temporary thin film.

Examples 1 to 11 are 4*4 cm² soda lime float glass samples of 0.55 or 0.7 mm thickness that were coated with different thicknesses of a ZnO coating on their air side, as can be seen in table 1.

Example 12 is a 4*4 cm² soda lime float glass sample of 0.4 mm thickness that was coated with a 160 nm thick ZnO coating on its tin side.

The ZnO coating was obtained by sputtering a metallic Zn target (purity>99.9%) in an argon/oxygen atmosphere on an industrial magnetron sputtering line.

Chemical strengthening of comparison examples C1 to C4 and of examples 1 to 12 was performed by placing in a cassette, preheating and then dipping in a molten $KNO_3$ (>99%) bath for a given set of duration and temperature, as can be seen in the table 1.

TABLE 1

| Sample Number | Glass thickness [mm] | ZnO thickness [nm] | Chemical strengthening Temperature [° C.] | Duration [h] |
|---|---|---|---|---|
| C1 | 0.55 | 0 | 430 | 4 |
| 1 | 0.55 | 25 | 430 | 4 |
| 2 | 0.55 | 35 | 430 | 4 |
| 3 | 0.55 | 45 | 430 | 4 |
| C2 | 0.7 | 0 | 430 | 4 |
| 4 | 0.7 | 25 | 430 | 4 |
| 5 | 0.7 | 30 | 430 | 4 |
| 6 | 0.7 | 35 | 430 | 4 |
| C3 | 0.55 | 0 | 465 | 4 |
| 7 | 0.55 | 10 | 465 | 4 |
| 8 | 0.55 | 20 | 465 | 4 |
| 9 | 0.55 | 50 | 465 | 4 |
| C4 | 0.55 | 0 | 430 | 2 |
| 10 | 0.55 | 25 | 430 | 2 |
| C5 | 0.55 | 0 | 410 | 4 |
| 11 | 0.55 | 25 | 410 | 4 |
| 12 | 0.40 | 160 | 430 | 41 |

After chemical strengthening, cooling, and washing, the samples carrying a ZnO coating were held for 1 minute in a bath containing pure acetic acid at room temperature of about 20° C. to etch off all of the ZnO coating. Then the surface compression stress (CS), depth of layer (DOL) and the curvature were measured as explained above.

No etching or chemical attack was visible on the glass substrate after etching.

The amount of potassium ($K^+$) in the surface of the chemically strengthened substrates was compared by X-ray fluorescence measurements and is given by an arbitrary unit of thousands counts per second [kcps].

The complete removal of the temporary thin film was confirmed by X-ray fluorescence measurements.

Table 2 summarizes the measurement data for the examples.

TABLE 2

| Sample ref | Curvature [1/m] | Air face | | | Sn face | | |
|---|---|---|---|---|---|---|---|
| | | CS [MPa] | DOL [µm] | $K^+$ [kcps] | CS [MPa] | DOL [µm] | $K^+$ [kcps] |
| C1 | 0.092 | 662 | 9.5 | 185 | 699 | 8.2 | 174 |
| 1 | 0.033 | 632 | 8.8 | 176 | 685 | 8.0 | 175 |
| 2 | −0.006 | 670 | 8.7 | 171 | 638 | 8.2 | 177 |
| 3 | −0.039 | 630 | 8.4 | 167 | 661 | 8.2 | 176 |
| C2 | 0.075 | 637 | 9.6 | 188 | 667 | 8.4 | 176 |
| 4 | 0.042 | 646 | 9.0 | 179 | 651 | 8.5 | 175 |
| 5 | 0.024 | 678 | 8.9 | 175 | 662 | 8.4 | 176 |
| 6 | 0.012 | 652 | 8.9 | 173 | 670 | 8.5 | 178 |

TABLE 2-continued

| Sample ref | Curvature [1/m] | Air face | | | Sn face | | |
|---|---|---|---|---|---|---|---|
| | | CS [MPa] | DOL [μm] | K⁺ [kcps] | CS [MPa] | DOL [μm] | K⁺ [kcps] |
| C3 | 0.190 | 522 | 17.1 | 269 | 525 | 13.3 | 258 |
| 7 | 0.124 | 569 | 15.5 | 259 | 570 | 13.8 | 256 |
| 8 | 0.016 | 578 | 15 | 251 | 559 | 13.8 | 255 |
| 9 | −0.112 | 585 | 14.6 | 241 | 571 | 13.8 | 255 |
| C4 | 0.081 | 718 | 7.4 | | 715 | 5.9 | |
| 10 | 0.049 | 697 | 6.2 | | 701 | 5.9 | |
| C5 | 0.075 | 744 | 7.5 | | 786 | 6.1 | |
| 11 | 0.046 | 777 | 7.2 | | 799 | 5.8 | |
| 12 | 7.7 | 509 | 31.1 | | not detectable | not detectable | |

As can be seen from the table above, when comparing C1 with examples 1 to 3, C2 with examples 4 to 6, C3 with examples 7 to 9, the temporary thin film reduces the amount of K⁺ that has exchanged with the Na⁺ at the air side of the glass substrate. The higher the temporary thin film's thickness, the more the extent of ion exchange is reduced on the coated surface. At the same time the depth of the compressive stress layer is reduced.

As can be seen from the curvature measurements, the uncoated comparison examples C1, C2, C3, C4, and C5 have a significant warpage or significant curvature with curvature levels above 0.04*1/m. They have positive curvature values, meaning that they are concave as seen from the tin side. When comparing C1 with examples 1 to 3, C2 with examples 4 to 6, C3 with examples 7 to 9, C4 with example 10, and C5 with example 11, it can be seen that the concave curvature first decreases and then becomes convex as the temporary thin film's thickness increases.

Example 12 shows that a very high curvature level of 7.7*1/m at least can be reached upon chemically strengthening a 0.4 mm thick glass substrate coated with a temporary thin film of the present invention. CS and DOL could not be measured on the tin side.

As these examples show that with a temporary thin film of the present invention by choosing a certain film thickness a wide range of controlled curvatures can be obtained, in a wide range of glass thicknesses and chemical strengthening conditions. Depending on the temporary thin film's thickness that is chosen the curvature after chemical strengthening can be controlled to be low or even controlled to a level where there is substantially no curvature. The curvature can also be controlled so as to obtain a very high curvature as shown in example 12.

The invention claimed is:

1. A glass substrate having first and second opposed surfaces formed by a process comprising:
coating on at least part of a first surface of the glass substrate a first temporary thin film that reduces an extent of ion exchange upon chemical strengthening, said first temporary thin film being essentially free of hydrogen and comprising an oxide of one or more metals selected from the group consisting of zinc, bismuth, cadmium, iron and nickel;
chemically strengthening the coated glass substrate; and
removing the temporary thin film after said chemical strengthening with an etchant solution that is an aqueous solution of a weak acid or a weak base,
wherein the first and second opposed surfaces have differing ion exchange properties in their uncoated state, the first surface being a high ion exchange surface and the second surface being a low ion exchange surface, and
wherein the first temporary thin film has a thickness comprised between 1 and 200 nm such that a first controlled curvature comprised between −0.04*1/m and 0.04*1/m is obtained upon the chemical strengthening.

2. The glass substrate according to claim 1, formed by a process further comprising:
coating on at least part of the first surface of the glass substrate a second temporary thin film that reduces the extent of ion exchange upon the chemical strengthening and that is different from the first temporary thin film,
removing the second temporary thin film after the chemical strengthening by treatment with said etchant solution, and
wherein a thickness of the second temporary thin film is chosen such that a second controlled curvature is obtained upon chemical strengthening in a part of the substrate coated by the second temporary thin film on the first surface.

3. The glass substrate according to claim 1, formed by a process further comprising:
coating on at least part of the second surface of the glass substrate a third temporary thin film that reduces the extent of ion exchange upon the chemical strengthening,
removing the third temporary thin film after the chemical strengthening by treatment with said etchant solution, and
wherein a thickness of the third temporary thin film is chosen such that a third controlled curvature is obtained upon chemical strengthening in the part of the substrate coated by the third temporary thin film on the second surface.

4. The glass substrate according to claim 1, wherein the substrate is coated on essentially the entirety of its first surface by the first temporary thin film.

5. The glass substrate according to claim 1, wherein the first temporary thin film is deposited by chemical vapor deposition, magnetron sputtering or plasma enhanced chemical vapor deposition.

6. The glass substrate according to claim 1, wherein the first temporary thin film comprises zinc oxide.

7. The glass substrate according to claim 1, wherein the glass substrate is chosen among a soda-lime glass substrate and an alumino-silicate glass substrate.

8. The glass substrate according to claim 1, wherein the glass substrate's thickness is between 0.1 mm and 3 mm.

9. The glass substrate according to claim 1, wherein there is no other coating than the first temporary thin film on the glass substrate.

10. The glass substrate according to claim 1, wherein the chemically strengthening the coated glass substrate occurs in a bath of molten salt comprising $KNO_3$ at a temperature between 400 and 500° C. for a duration of 20 minutes to 24 hours.

11. The glass substrate according to claim 1, wherein the etchant solution has a pH from 2 to 4.

12. The glass substrate according to claim 1, wherein the etchant solution has a pH from 8 to 10.

13. The glass substrate according to claim 1, wherein the glass substrate has a curvature between −0.01*1/m and 0.01*1/m after the chemical strengthening.

14. The glass substrate according to claim 1, wherein the substrate has a thickness between 0.1 mm and 1.6 mm.

15. The glass substrate according to claim 1, wherein after the chemical strengthening the glass substrate has on both surfaces a compressive surface stress between 300 and 1300 MPa and a depth of compressive layer comprised between 6 and 40 µm.

16. The glass substrate according to claim 1, wherein the oxide of the first temporary film is formed by sputtering a metallic target in an atmosphere comprising oxygen and argon.

17. A glass substrate having first and second opposed surfaces formed by a process comprising:
coating on at least part of a first surface of the glass substrate a first temporary film that reduces an extent of ion exchange upon chemical strengthening, said first temporary film being essentially free of hydrogen and comprising an oxide of one or more metals selected from the group consisting of zinc, bismuth, cadmium, iron and nickel;
chemically strengthening the coated glass substrate; and
removing the temporary film after said chemical strengthening with an etchant solution that is an aqueous solution of an acid having a pH from 2 to 4 or of a base having a pH from 8 to 10,
wherein the first and second opposed surfaces have differing ion exchange properties in their uncoated state, the first surface having a higher ion exchange than the ion exchange of the second surface, and
wherein the first temporary film has a thickness from 1 and 200 nm such that the glass substrate has a first controlled curvature between −0.04*1/m and 0.04*1/m after the chemical strengthening.

18. The glass substrate according to claim 17, formed by a process further comprising:
coating on at least part of the first surface of the glass substrate a second temporary film that reduces the extent of ion exchange upon chemical strengthening and that is different from the first temporary film,
removing the second temporary film after the chemical strengthening by treatment with said etchant solution, and
wherein a thickness of the second temporary film is chosen such that a second controlled curvature is obtained upon the chemical strengthening in a part of the substrate coated by the second temporary film on the first surface.

19. The glass substrate according to claim 17, wherein the first temporary film comprises zinc oxide, and
wherein the glass substrate is chosen among a soda-lime glass substrate and an alumino-silicate glass substrate.

* * * * *